United States Patent [19]

Fujii et al.

[11] Patent Number: 4,809,097
[45] Date of Patent: Feb. 28, 1989

[54] MAGNETIC RECORDING AND REPRODUCING APPARATUS

[75] Inventors: Toshifumi Fujii; Jun Kikuchi, both of Nagaokakyo, Japan

[73] Assignee: Mitsubishi Denki Kabushiki Kaisha, Tokyo, Japan

[21] Appl. No.: 905,318

[22] PCT Filed: Dec. 19, 1985

[86] PCT No.: PCT/JP85/00695
§ 371 Date: Aug. 21, 1986
§ 102(e) Date: Aug. 21, 1986

[87] PCT Pub. No.: WO86/03920
PCT Pub. Date: Jul. 3, 1986

[30] Foreign Application Priority Data

Dec. 21, 1984 [JP] Japan .................. 59-271169

[51] Int. Cl.⁴ .................................. H04N 5/78
[52] U.S. Cl. .................. 360/9.1; 360/22; 360/36.1; 360/33.1; 358/335; 358/337
[58] Field of Search ............ 360/9.1, 22, 23, 36.1, 360/33.1, 37.1, 64; 358/335, 337

[56] References Cited

U.S. PATENT DOCUMENTS

| 3,809,805 | 5/1974 | Kasprzak | 360/23 |
| 4,330,795 | 5/1982 | Foerster | 360/33.1 |
| 4,541,020 | 9/1985 | Kimura | 360/22 |

FOREIGN PATENT DOCUMENTS

| 24281  | 2/1983 | Japan | 358/335 |
| 124382 | 7/1983 | Japan | 358/335 |
| 124385 | 7/1983 | Japan | 358/335 |

*Primary Examiner*—Alan Faber
*Attorney, Agent, or Firm*—Birch, Stewart, Kolasch & Birch

[57] ABSTRACT

In a VTR which provides recording and reproduction of one field video signal the signal is divided into N signal portions with the use of M number of magnetic heads. The signal to be recorded into the nth (n=1, 2, ..., N) track is delayed by a time (n−1)·T at the recording end and an addition signal of period E is inserted into the blanking period which results from the delaying, and during reproduction or play-back the signal reproduced from the n-th track is delayed by a time (N−n)·d, and is TBC processed, thereby obtaining a composite screen with no skew.

4 Claims, 5 Drawing Sheets

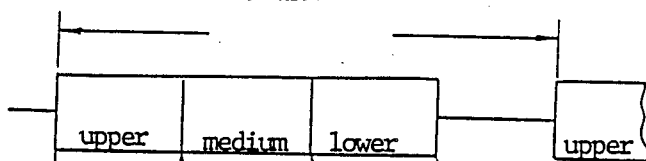
FIG.2a input video signal
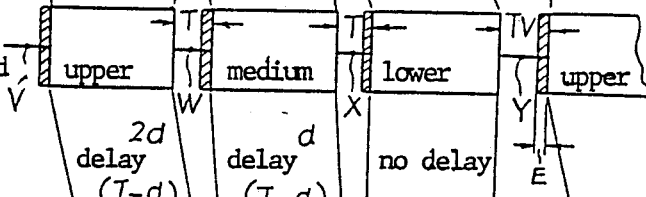
FIG.2b recorded and reproduced video signal
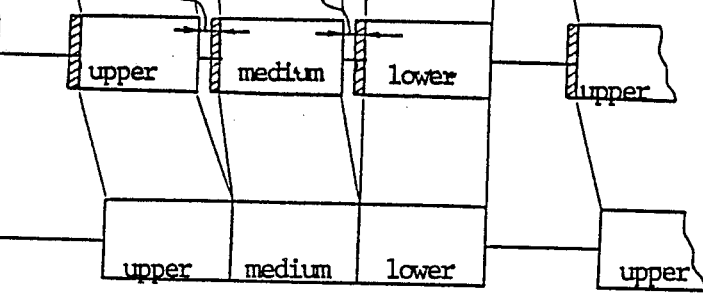
FIG.2c time axis corrector input
FIG.2d output video signal
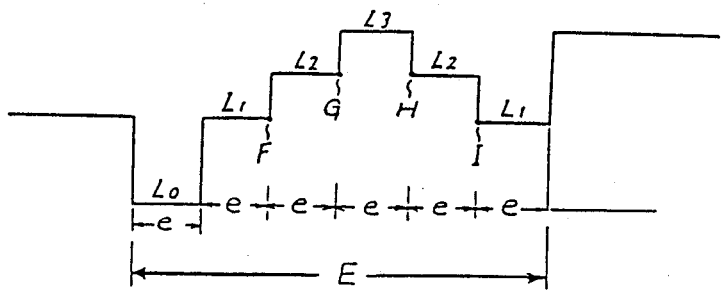
FIG.2e addition signal

MAGNETIC RECORDING AND REPRODUCING APPARATUS

TECHNICAL FIELD

The present invention relates to a magnetic recording and reproducing apparatus for recording and reproducing one field of a video signal with the signal divided into a plurality of tracks with the use of a plurality of rotation heads, and more particularly to a recording and reproducing system capable of improving the joining of the portions of video signals which appear on the television screen.

BACKGROUND ART

Conventionaly, in a helical scanning type magnetic recording and reproducing apparatus (hereinafter referred to as "VTR"), especially in a VTR for domestic use, a method for recording one field video signal in one track has been utilized. By way of attempting the miniaturization of the VTR, a system has been devised in which the number of rotations of the rotation drum on which heads are installed is made twice and the diameter of the rotation drum is reduced to a half on an assumption that the relative speed of the head and the magnetic tape is not changed, that is, the characteristics of recording and reproducing is not changed. In this system, one field video of the signal to be recorded is divided into two tracks, and accordingly there exist two signal junctions in a field. When one of the signal junctions is placed at the horizontal blanking period similarly as in the conventional one field-one track recording system, the other signal junction comes at the center of the screen. Accordingly, in order to realize this system it is necessary to obtain a good junction of video signals at the center of the screen, but this is not so simple as will be described below.

Now suppose that an upper half portion and a lower half portion of the screen are recorded and reproduced by two heads, respectively. When there is a difference in tape tension between at the time of recording and at the time of reproduction, there arises a time discontinuation in the head switching position, producing what is called skew. This will be described with reference to FIGS. 4(a)–4(e).

In FIG. 4(a), the reference numeral 2 designates a magnetic tape, the numerals 3a and 3b designate tracks recorded by the heads 1a and 1b, respectively. If the head 1b is positioned at the position B where the recording is conducted at the same time as at the position A when the head 1a comes to the head switching point A at the reproduction, the junction of the signals at the center of the screen is made in a proper manner. This situation is shown in FIG. 4(b). The reference character P in the drawing represents a signal junction on the screen. However, when the position B is deviated to the position B1 caused by the variation in the tape tension the signal between the position B and B1 will be dropped as shown in FIG. 4(c). Furthermore, when the position B is deviated to the position B2, the signal between the position B2 and B will be repeatedly reproduced as shown in FIG. 4(d). Herein, FIGS. 4(c) and 4(d) shows the amount of skew which is exaggerated for purposes of explanation. In an actual VTR the amount of skew is less than a horizontal scanning period, and when it is received by a television receiver for domestic use, it appears as a curve on the screen by an AFC circuit having an internal synchronization system as shown in FIG. 4(e). In any event, when a skew occurs, a signal junction at the center of the screen is visible and undesirable, when viewed.

However, it is quite difficult to eliminate skew in a helical scanning type VTR. This has been an obstacle in the development of a field division type VTR.

Recently, as a result of the increase in the integration and the decrease in the cost of integrated circuits as a result of advances in semiconductor technology, it has become possible to correct the skew or jitter by including a digital time axis correction circuit (this is implemented by a time axis variation detection circuit and a time axis variation correction circuit, and this is hereinafter referred to as "DTBC") with a VTR. For example, in a DTBC shown in Japanese Laid Open Patent Publication No. Sho. 58-124385, the detection of the time axis variation (time axis error) of the input video signal is conducted by detecting a difference between a sampled phase and a predetermined phase, which sampled phase is obtained by sampling the input video signal by a standard clock signal based on a predetermined phase relationship existing between a predetermined system television video signal and a local standard clock signal. This correction is conducted in such a manner that the time axis error of the input video signal is divided into a large error component with a length of one sampling clock period as a unit and a small error component which is smaller than a sampling clock period, and the former is corrected by adjusting the timing of the reading out from the shift register properly, and a high preciseness correction of the latter is conducted by replacing the driving clock signals for the D/A converter for taking out a corrected output video signal or for the input side A/D converter by a signal which is obtained by applying a phase modulation to a clock signal locked with a standard synchronous signal in accordance with the time axis error.

However, if recording and reproduction are conducted simply in such a device, signal drops or duplication of signals may arise caused by the skew as described with reference to FIGS. 4(a)–4(e). Especially, when a signal drop arises it is impossible to correct the same even by the DTBC. A well known method to solve this problem will be described below.

FIGS. 5(a) and 5(b) are diagrams for exemplifying the principle of this well known method. As shown in FIG. 5(a), at the recording end the video signals to be recorded of the upper half and the lower half of the screen are time axis compressed in each track, and at the reproduction end the signals are time extended, i.e. expanded, to restore to the original state. FIG. 5(b) shows a track pattern on the magnetic tape 2. The time axis compressed video signals are recorded at the diagonal line sections E of the tracks 4(a) and 4(b). The reference characters C and D designate the head switching points. Accordingly, signal drops or signal duplications can be avoided by properly establishing a compression rate at the recording properly such that the points C, D and the diagonal line sections E do not cross each other due to the skew.

In this conventional method, however, a large capacity memory of about a half field is required and two different kinds of clock frequencies are required, whereby the circuit size is undesirably increased.

THE DISCLOSURE OF THE INVENTION

The present invention is directed to solving the disadvantages of the conventional device described above, and has its object to provide a VTR in which one field signal is recorded with divided into N (N is an integer larger than or equal to 2, independent on N) tracks with the use of M (M is an integer larger than or equal to 1) number of heads, and which is capable of correcting distortions on the reproduced screen without the use of a large size memory circuit.

According to the present invention, a delay circuit for delaying for the predetermined time the signals to be recorded into the N tracks and a time axis correction circuit for restoring one field video signal by executing a time axis correction to the reproduced signal are provided with a VTR for recording and reproducing one field video signal with the signal divided into N tracks with the use of M number of heads.

In the present invention, one field video signal to be divided into N tracks are delayed by a predetermined time for each track at the recording, respectively, thereby providing blanking periods between the divided signals on the television screen by sharing the vertical blanking period into the both ends of each track, and at the reproduction the head switching is conducted within the blanking period, and the signal with no signal drops at the signal junction on the television screen is input to the time axis correction circuit, whereby distortions on the reproduced screen are corrected.

According to the present invention, in recording and reproducing one field video signal with the signal divided into N tracks with the use of M number of heads, each signal of the N tracks is delayed by a predetermined time to be recorded, and the vertical blanking period of the video signal is shared to the both ends of each track as blanking periods, and the head switching is conducted in this blanking period, whereby an output video signal with no signal drop on the television screen due to the skew is simply and surely obtained.

BRIEF DESCRIPTION OF THE DRAWINGS

FIGS. 2(a)-(e) are diagrams for exemplifying the processes of recording and reproducing by the VTR;

PREFERRED EMBODIMENT OF THE INVENTION

Figure 1A:
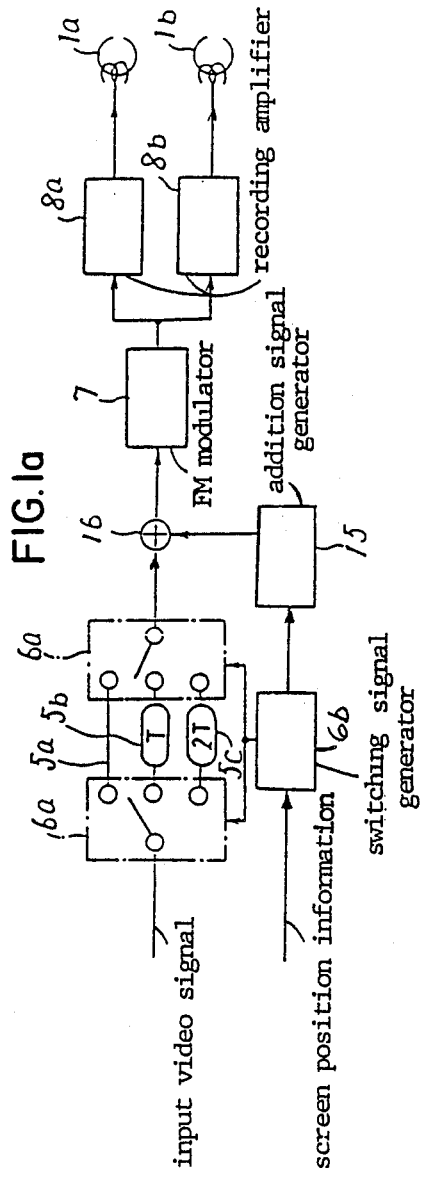
FIGS. 1(a) and (b) are electrical block diagrams showing the constructions of the signal processings of the recording system and the reproducing system of a VTR as embodied by the present invention.
Figure 1B:
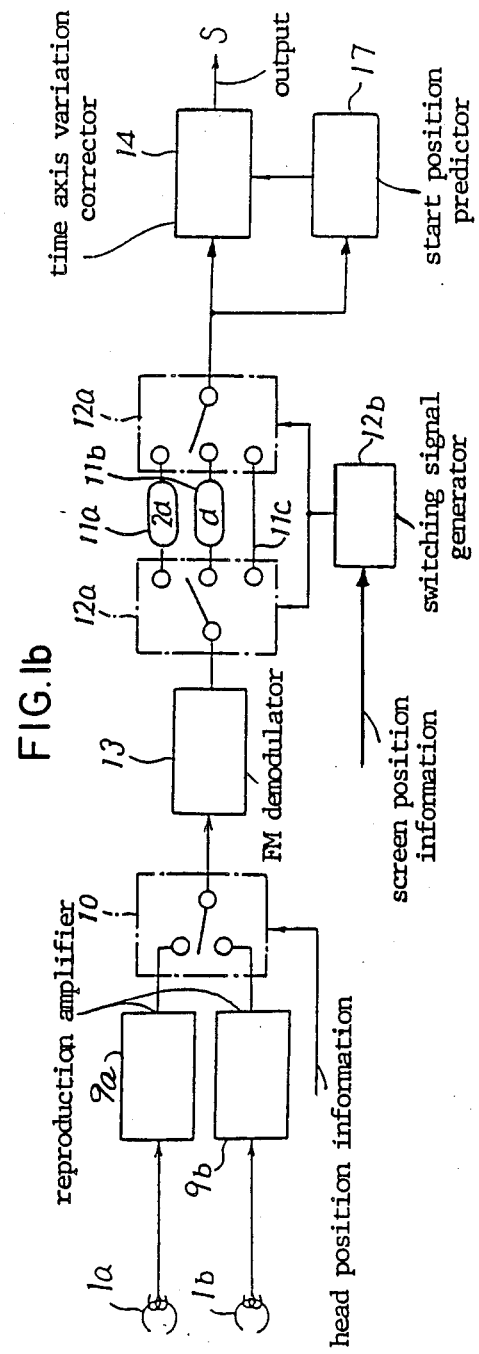

The embodiment of the present invention will be described with reference to drawings. FIGS. 1(a) and 1(b) broadly illustrate apparatus for processing signals in the recording and the reproducing/play-back sections of a VTR system according to the present invention. In this embodiment the number of the heads M utilized is 2, and the number of the screen divisions N is set to 3. That is, the field of the video signal is recorded into three tracks with the use of two heads. Furthermore, in this embodiment delay line means for delaying the signal reproduced from each track is provided in the reproducing system for delaying the respective signal by a predetermined time. The divided signal portions on the television screen are delayed by these delay lines such that a time axis correction quantity required for restoring the divided signals stays within the correction ability range of a time axis corrector, and thereafter the time axis correction is effected.

Furthermore in this embodiment, an addition signal is inserted into the video signal where division processing is executed, and a start position of the divided video signal is predicted with the use of the addition signal during signal play-back and reproduction.

In FIG. 1(a), reference numerals 5a, 5b, and 5c designate a first to third delay line for delaying the input video signal r by a predetermined time, in this instance 0, T, and 2T, respectively. The reference numerals 6a and 6b designate a switch and a switching signal generator therefor for switching the delay lines 5a, 5b, and 5c in accordance with the position on the screen obtained from the screen position information of the video signal r. The reference numeral 15 designates an addition signal generator. The reference numeral 16 designates an adder for adding an addition signal to the video signal. The reference numberal 7 designates an FM modulator. The reference numerals 8a and 8b designate recording amplifiers provided for the corresponding two heads 1a and 1b, and the outputs of the recording amplifier 8a and 8b are coupled to the heads 1a and 1b, respectively.

Furthermore, in the reproducing section (FIG. (1b), reference numerals 9a and 9b designate reproduction amplifiers for amplifying the signals reproduced by the heads 1a and 1b, respectively. The reference numeral 10 designates a head switch for switching the outputs from the reproduction amplifiers 9a and 9b in accordance with the head position on the tape. The reference numeral 13 designates a FM demodulator. The reference numerals 11a, 11b, and 11c designate a fourth to sixth delay lines for delaying the output of the FM demodulator 13 by a predetermined time, in this instance, 2d, d, and 0, respectively. The reference numerals 12a and 12b designate a switch and a switching signal generator therefor for switching the delay lines 11a, 11b, and 11c in accordance with the position on the screen to be reproduced obtained from the screen position information. The reference numeral 14 designates a time axis corrector for detecting the time axis variation of each reproduced signal portion and correcting the time axis variation in accordance with a detected offset. This time axis corrector is well known, as shown, for example, in Japanese Laid Open Patent Publication No. 58-124385. The reference numeral 17 designates a start position predictor for predicting the start position of the video signal by detecting the addition signal added at the recording end. Furthermore, the reference character S designates the output video signal. Besides, the switching signal generators 6b and 12b can be simply constructed such as by a counter which receives the vertical and horizontal synchronous (synch) signal as screen position information, counts the horizontal synchronous signals, and is reset by the vertical synchronous signal, or a horizontal synchronous signal at a predetermined head switching position.

FIGS. 2(a)-2(e) show the manner of the division and the delay of the input video signal r in the recording and reproducing process by the apparatus of the embodiment shown in FIGS. 1(a)-1(b). The "upper", "middle", and "lower" shown in FIG. 2(a) represent the "upper", "middle", and "lower" portion of one field of the television screen obtained by divided the video signal into three parts. The straight line section represents the blanking period which does not appear on the television screen.

The diagonal line sections shown in FIG. 2(b) and 2(c) shown addition signals which are generated by the addition signal generator 15 shown in FIG. 1(a) and are added by the adder 16. FIG. 2(e) shows an enlarged view of an example of the addition signal.

Figure 3:
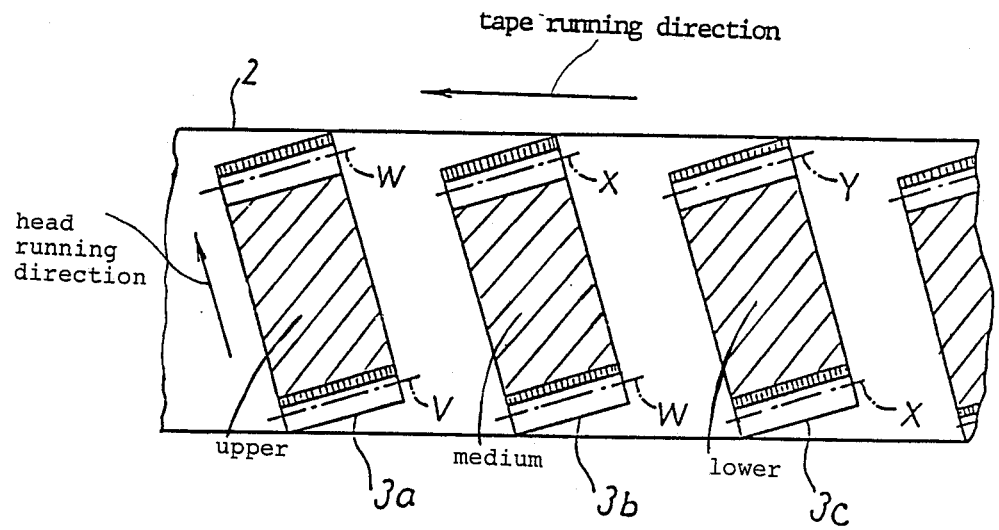
FIGS. 3a-3c are diagrams showing the track pattern on a magnetic tape of the VTR shown in FIG. 1.
Figure 4A:
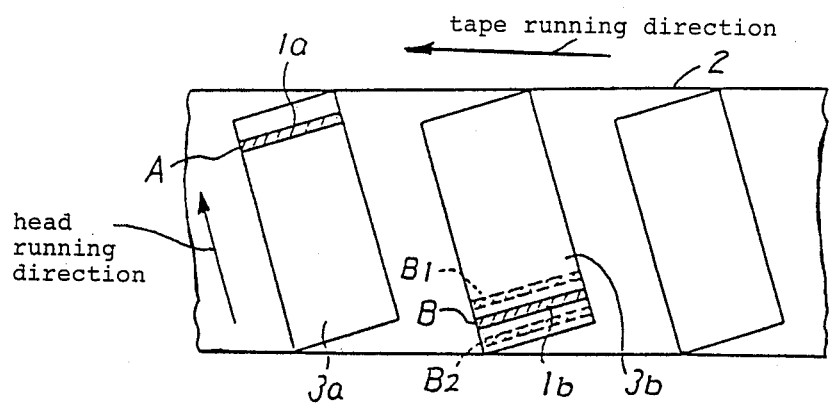
FIGS. 4(a)-4(e) are diagrams exemplifying the influence of the time axis variation in a VTR.
Figure 4B:
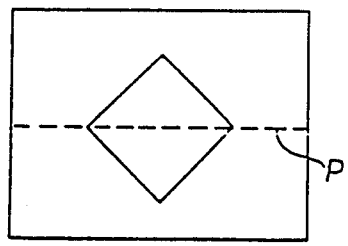
Figure 4C:
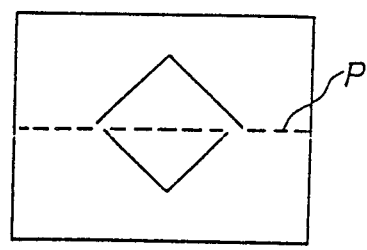
Figure 4D:
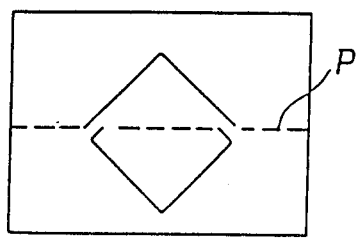
Figure 4E:
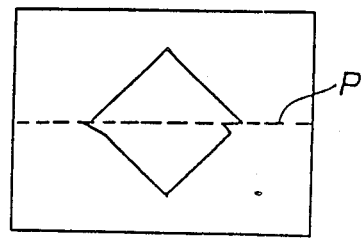
Figure 5A:
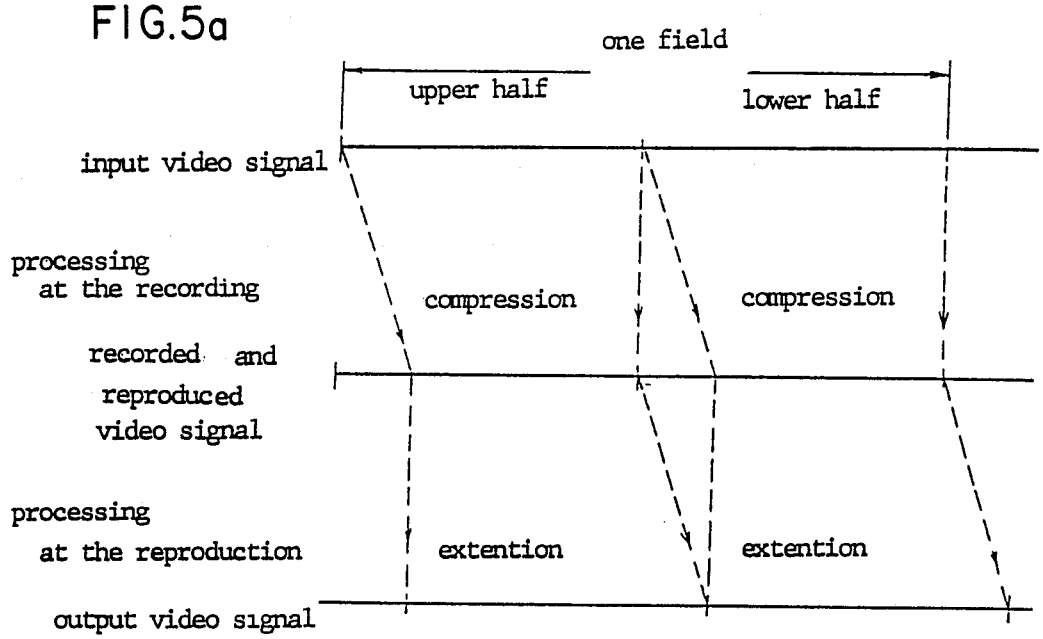
FIGS. 5(a) and 5(b) are diagrams exemplifying the method of correcting the time variation in a conventional VTR.
Figure 5B:
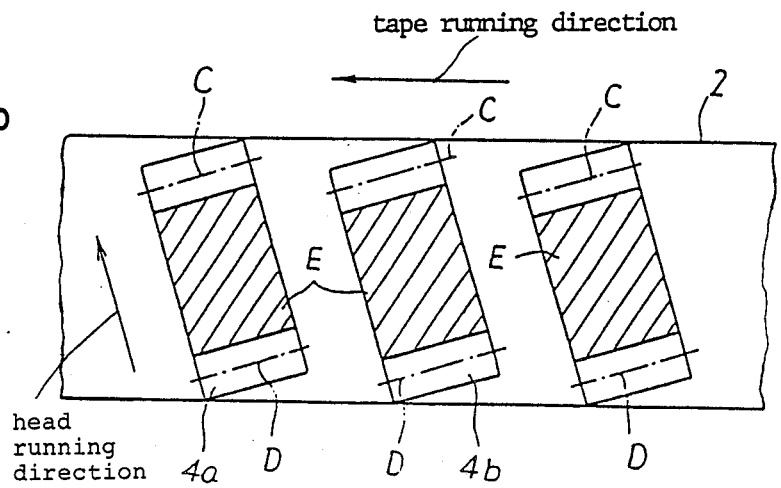

FIG. 3 shows a track pattern on a magnetic tape 2. In FIG. 3 the diagonal line sections on the video signal tracks 3a, 3b, and 3c show recorded portions of signals appearing on the television screen. The reference characters V to Y designate head switching positions, and they correspond to V to Y on the recorded and reproduced signal axis shown in FIG. 2(b).

The device operates as follows.

At the recording end, the input video signal r to be recorded is divided into three portions, and the "upper" portion in one field of the television screen is recorded with a delay time of 0 via the first delay line 5a, that is, recorded as is through the FM modulator 7, the recording amplifier 8a, and the head 1a as shown in FIG. 2(b). Next when the switching signal generator 6b counts a predetermined number of horizontal sync signals a switching signal is generated from the generator 6b, whereby the first delay line 5a is switched to the second delay line 5b. Accordingly, the signal at the "middle" portion in one field of television screen is delayed by a predetermined time T, and thereafter it is recorded through the FM modulator 7, the recording amplifier 8b, and the head 1b as shown in FIG. 2(b). Furthermore, when signal generator 6b counts a predetermined number of horizontal synch signals, the second delay line 5b is switched to the third delay line 5c. Accordingly, the signal of the "lower" portion in one field of television screen is delayed by a predetermined time 2T, and thereafter it is recorded through the FM modulator 7, the recording amplifier 8a, and the head 1a as shown in FIG. 2(b).

In such a recording method, the blanking period between the "upper" portion and the "middle" portion and the blanking period between the "middle" portion and the "lower" portion become both T in the recorded and reproduced video signal shown in FIG. 2(b). The time T selected such that the blanking period Tv between the "lower" portion and the "upper" portion of the next field become larger than the time T.

Thereafter, the same operation is repeated. In this recording method the vertical blanking period in the video signal is shared at both ends of the signal on the television screen of each track as a blanking period as shown in FIG. 3.

In the addition signal generator 15 an addition signal having a period E (E<T) is generated at the latter half of each blanking period as shown in FIG. 2(b). The generation timing of the addition signal is determined as similarly as the generation of the above-mentioned switching signal in the switching signal generator 6b. The addition signal is added in the blanking periodd of the video signal by the adder 16 and FM modulated, and is recorded together with the video signal.

Next, the reproduction operation will be described with reference to FIG. 1(b). At the reproduction end, the signal on a track into which the signal is recorded by the head 1a, for example, is reproduced by the same head 1a. *In like fashion, the signal on a track into which the signal is recorded by the head 1b* is reproduced by the same head 1b. The outputs of the heads 1a and 1b pass through the reproduction amplifiers 9a and 9b, respectively, in accordance with the operation of the head switch 10 which selects the output of the head which is now reproducing a signal on the basis of the head position information received. The switching signal generator 12b counts the number of synch signals in the reproduced signal as screen position information, and operates similarly to the operation of the switching signal generator 6b at the recording end. Accordingly, the switch 12a is switched so that the signals of the "upper", "middle", and "lower" portions in the television screen pass through the fourth, fifth, and sixth delay lines 11a, 11b, and 11c, respectively.

Further, as shown in FIG. 2(c) the reproduced signal of the "upper" portion in the television screen is an output which is delayed by a predetermined time 2d by the fourth delay line 11a. The reproduced signal of the "middle" portion in the television screen is an output which is delayed by a predetermined time d by the fifth delay line 11b, and the reproduced signal of the "lower" portion in the television screen is an output which is delayed by a delay time 0 by the sixth delay line 11c, that is an, output as is.

The head switching in the above described process is conducted at the points V to Y shown in FIG. 2(b) and FIG. 3. That is, the timing of the head switching is coincident with the periods which are obtained by sharing the vertical blanking periods. If the quantity (T−d−E) which is obtained by subtracting the period of the addition signal E from the difference between the predetermined delay time T at the recording and the predetermined delay time d at the reproduction is selected to be larger than a possible maximum skew quantity, and the above-mentioned delay time d is selected such that the maximum time axis correction quantity required for restoring the divided signal on the television screen stays within the correction ability range of the time axis corrector 14, the time axis variations of the output signals of the delay lines 11a, 11b, and 11c is corrected by the time axis corrector 14, and an output video signal S with no signal drop on the television screen due to the skew is obtained as shown in FIG. 2(d).

Next, the use of the addition signal which is added at the recording end will now be described. Units of the signals are divided with a horizontal scanning period as described above. Accordingly, the time axis variation corrector 14 detects the start position of the divided video signal by detecting the first horizontal synch signal. When it is impossible to detect the first horizontal synch signal of the above-mentioned segment caused, such as by a generation of a drop out, there results in a signal drop that arises in a portion of the video signal because the signal is processed assuming that a blanking signal is reproduced when the next horizontal synchronous signal is detected. The addition signal is used to avoid such a condition. The addition signal is in a low level state $L_0$ during the first period e as shown in FIG. 2(e). This state is detected by the start position predictor 17, where it is determined that the reproduction of the addition signal has started. Herein, the period e is established sufficiently wider than the width of the horizontal synch signal. Accordingly, the possibility that a signal drop may arise due to, for example, a drop out is decreased to a great extent relative to the horizontal synch signal. Next, in the start position predictor 17, the transition of the signal level is detected. That is, the transition points F, G, H, and I between the levels $L_1$, $L_2$, and $L_3$ which are previously established as shown in FIG. 2(e) are detected, and the start position of the video signal is predicted from the detected result, thereby accounting for a drop of the first horizontal synch signal of the segment. In this case, it is possible to make this prediction with a high degree of precision even if one point is detected among the four transition points.

In the recording and reproducing process of this embodiment, the dropped portion of the information due to skew is relegated to the blanking periods and is obtained by sharing the vertical blanking period or to the addition signal period so that at least the signal on the television screen will not be dropped, since the information during the vertical blanking period, that is, the vertical synch signal is always a well known information which occurs with a predetermined regularity. Accordingly, a signal drop of this portion of the signal will raise no problem if a configuration is adopted wherein a vertical synchronous signal to be inserted into the output video signal is generated at the reproduction end. Such a configuration is easily obtained.

According to this embodiment, and as evident from the foregoing the signals of three tracks which constitute one field video signal are recorded with delays of a predetermined time 0, T, and 2T, respectively. The vertical blanking period is shared at the both ends of each track and comprises the blanking period and with an addition signal period, and thereby controlling head switching in the blanking period. Drops in the reproduced signal on the television screen are thereby eliminated, and the generation of skews at a signal junction is obviated. Furthermore, in this invention, a memory of a large capacity as in conventional device is not required, and therefore the apparatus can be obtained at a low cost.

In the above-illustrated embodiment, the respective track signals of one field video signal which are divided into N tracks are delayed by a predetermined time at the reproduction end so as to reduce the load on the time axis corrector. The fourth to a sixth delay lines, the switch, and the switching signal generator at the reproduction end can be modified to achieve the same effects as those of the illustrated embodiment if the correction range of the time axis corrector is sufficiently wide.

Furthermore, in the illustrated embodiment the addition signal is recorded at the recording end and at the reproduction end the starting point of a field segment is predicted utilizing the addition signal as a safeguard against a case where the first horizontal synchronous signal of each segment may drop. The addition signal generator, the adder, and the start position predictor can be modified to achieve with the same effects as those of the illustrated embodiment if the horizontal synchronous signal is stably reproduced.

What is claimed is:

1. A magnetic recording and reproducing apparatus of a helical scanning type for recording and reproducing one field of a video signal with the video signal being divided into a plurali ty of signal portions recorded onto N (N is an integer equal to or greater than 2) tracks with the use of M number of heads (M is an integer equal to or greater than 1) which are provided at an interval of 360°/M on a rotational drum, comprising: delay line means for delaying the signal recorded at the recording end into the nth (n=1, ..., N) track by a time (n−1) T where T is equal to a predetermined time; and time axis variation corrector means at the reproducing end for correcting the time axis variation of each signal reproduced from each of the N tracks and which join said signal portions together, thereby restoring said one field of said video signal.

2. A magnetic recording and reproducing apparatus as defined in claim 1, and additionally comprising delay line means for delaying the signal portion reproduced from the nth (n=1, 2, ..., N) track at the reproducing end by a time (N−n)·d where d is equal to a predetermined time, and where d<T.

3. A magnetic recording and reproducing apparatus as defined in claim 2, and additionally comprising addition signal generator means at the recording end for generating an addition signal of a period E in the blanking period where E<T and which results from the delay provided by said delay line means, signal adder means for adding said addition signal to the video signal at the recording end, and start position predictor means at the reproducing end for predicting the start point of said divided video signal in response to said addition signal.

4. A magnetic recording and reproducing apparatus as defined in claim 2, wherein there are provided an addition signal generator for generating an addition signal of period E (E<T) in the blanking period which results from the delaying at the recording, an adder for adding said signal, and a start position predictor for predicting the start point of the divided video signal from said addition signal at the reproduction.

* * * * *